United States Patent [19]

Hutcheson

[11] Patent Number: 5,528,377
[45] Date of Patent: Jun. 18, 1996

[54] EXTENDED DENSITY COLOR PRINTING

[75] Inventor: Donald B. Hutcheson, Washington, N.J.

[73] Assignee: E. I. Du Pont de Nemours and Company, Wilmington, Del.

[21] Appl. No.: 219,594

[22] Filed: Mar. 29, 1994

[51] Int. Cl.$^6$ .............................. G03F 3/08; H04N 1/21; H04N 1/46
[52] U.S. Cl. .......................... 358/298; 358/520; 358/515
[58] Field of Search ..................................... 358/296, 298, 358/406, 501, 504, 515, 518, 520–25, 527, 530; 386/166, 167

[56] References Cited

U.S. PATENT DOCUMENTS

| | | | |
|---|---|---|---|
| 4,837,613 | 6/1989 | Paxton et al. | 358/75 |
| 4,965,664 | 10/1990 | Udagaw et al. | 358/80 |
| 4,992,862 | 2/1991 | Gabor | 358/76 |
| 5,077,604 | 12/1991 | Kivolowitz et al. | 358/75 |
| 5,184,214 | 2/1993 | Tatsumi | 358/75 |
| 5,209,162 | 5/1993 | Whitbey | 101/211 |
| 5,212,546 | 5/1993 | Arazi et al. | 358/80 |
| 5,323,249 | 6/1994 | Liang | 358/518 |

OTHER PUBLICATIONS

Eder, I., The Seven Color Evolution–A New Optical dimension, *Deutscher Drucker,* Printing Drupa Supplement II/90,I, DD Drupa Beilage Nov. 1990.
"7–Color Printing Cromalin® As a Partner In A New Vision," *Spectrum,* 3'91 Du Pont Systems For Graphic Communications.
Küppers, H., *Du Mont's Farben Atlas,* 13, 17, 105, 127, 1988.
Kueppers, *The Basic Law Of Color Theory,* Barron's, Germany, 1980, 209–210, 214.
Kuppers Color Atlas, Translated by Mike Burgsten.
*The Royal Zenith Laser Scanning System .*
5th *Color Operation,* RZ 200–S, Technical Bulletin 3.

*Primary Examiner*—Peter S. Wong
*Assistant Examiner*—Gregory Toatley, Jr.
*Attorney, Agent, or Firm*—Thomas H. Magee

[57] ABSTRACT

A process for reproducing an original color image on a printing device includes separating each pixel of the original image into a plurality of color components to obtain an image density value for each color component at each pixel. A number of printing elements are selected for each color component, the number of printing elements being more than one for at least one of the color components. The printing density values for each color component having more than one printing element are separated into at least two pixel groups, the first pixel group containing printing density values less than or equal to an assigned maximum printing density value achievable with a single printing element for that color component, and the second pixel group containing printing density values greater than said assigned maximum printing density value for that color component. Printing elements are prepared for each color component having more than one printing element wherein a first printing element produces printing density values equal to the printing density values for each pixel in a first group and also produces printing density values equal to said assigned maximum printing density value for each pixel in a second pixel group, and a second printing element produces printing density values obtained by substracting said assigned maximum printing density value from the printing density value for each pixel in the second pixel group.

10 Claims, 6 Drawing Sheets

EXTENDED DENSITY COLOR PRINTING

BACKGROUND OF THE INVENTION

1. Field of the Invention

This invention pertains to color image processing and, more particularly, to a process for preparing color separation images from an original color image wherein highly saturated portions of the original color image are reinforced by a subset of the color separation images.

2. Description of the Prior Art

In conventional processes for reproducing color images, an original color image is electronically scanned and divided into a plurality of areally arrayed picture elements, called pixels. During the scanning operation, it is conventional to use red (R), green (G), and blue (B) filters to intercept a scanning light beam so as to separate the image into its RGB components. A digital number representing the average analog density of the corresponding area on the physical image within that pixel is assigned to each pixel for each of the three color components and retained in memory in separate color image data files from which an electronic image of the original image can be reconstructed. Because of the digital nature of these files, the reconstructed image can be easily stored, processed and viewed, most commonly on a video monitor using standard image processing techniques.

A popular application of this technology within the graphic arts industry occurs when a color-separated image is reconstructed on a color monitor. By electronically altering the stored color image data files for each of the pixels, it is possible to make desired color enhancements or image alterations—a practice known as electronic color editing. When color editing, an operator is able to compensate for imperfect originals, change colors and intensities to produce a more aesthetically pleasing image, as well as add or delete details of the color image to be printed. After this color image manipulation is accomplished on all the pixels within the image, conventional halftone image films are produced from which printing plates or other elements for conveying the colorant to a suitable substrate, hereinafter called plates, are made. The plates are used to reproduce the desired image on a printing press using well known cyan (C), magenta (M), yellow (Y), and black (K) color printing inks or other colorants.

Prior to printing the color image on a printing device, a color proof is frequently made to confirm the suitability of the enhanced image. Color proofs can be produced in several ways including exposing halftone image films for CMYK and using these halftone image films in non-ink proofing systems to produce corresponding CMYK proofs using colorants other than printing inks, such as colored toners, ink-jet inks or precolored imaging layers. Examples of such non-ink proofing systems include Cromalin® and Water-Proof® sold under these names by E. I. du Pont de Nemours and Company of Wilmington, Del.

An essential part of this electronic color editing process is establishing an accurate correlation between the original image, the electronic data generated during the color separation scanning step, the image displayed on a color monitor, and the final color image as produced on a color printing device. During this correlation effort, compensations are determined for the type of printing device (for example, sheet-fed, offset lithography or gravure) and printing inks used for the display characteristics of the color monitor and, more importantly, for the apparatus (frequently a color scanner with color filters) used to produce input RGB image data files from an original image. During this compensation or calibration process, it is generally the case that the magnitude of color image processing enhancements that can be achieved within an image are limited by the color output range of the printing device to be employed using the traditional four-color-process CMYK printing inks, each ink being associated with a single printing plate. In color image processing, range is defined as the plurality of different color hues and densities controllably reproducible with a predefined set of inks or additional special colorants. A maximum color density value is assigned to each of CMYK based on the maximum amount of ink that can be transferred in a controlled manner from the printing device to the paper being printed upon. Thus, the ability to accurately reproduce an image may be limited to only those densities equal to or less than the print densities available on the printing device. Conventionally, each ink is printed only once during the printing process, i.e., there is only one plate associated with each ink.

Efforts have been made to extend beyond conventional processes by color separating into more than the traditional four-color-process CMYK inks, for instance, by separating into a special set of eight ink colors (CMYKRGB plus white). A printing process employing the special eight printing inks, including an opaque white when printing on a non-white surface, has been introduced by Kuppers, a printing firm in Germany. The process is based on a reference color atlas which provides correlation of printed colors with the required color ink combinations. Also, it is necessary to print all of the seven or eight inks once each to accurately reproduce an image. A major problem with this "CMYKRGB" separation technique is that the halftone image patterns for the extra RGB plates must be made at three new angles in order to avoid moiré interference with the halftone image patterns for the CMYK plates. This is a problem because of the well-known need to separate each plate's screen angle from it's nearest neighbors by a multiple of 120°, which limits the available number of optimum screen angles to three. To solve this problem, new halftone image printing techniques, such as frequency modulation or stochastic screening, have been employed. These new techniques, in turn, cause other problems such as a coarse image texture and difficulty resolving the micro grain elements on offset plates or proofing materials. These problems, in turn, lead to difficulty providing pre-press proofs that match the color and tonality of a printed sheet. Other problems with the CMYKRGB approach to HiFi color separation include the need for special RGB inks and special proofing materials, and the need to always run seven plates without the economic options to use only five or six plates.

Another similar practice within the industry employs four-color-process CMYK inks to print an image, but overprints that four-color printed image with special RGB color inks to achieve an extended printed color gamut. It is frequently necessary to print each of the seven inks, including the three special RGB inks, to accurately reproduce an image but, as with the so-called Kuppers technique, potential problems with moiré interferences and proofing are created.

Another approach to extend the printed color gamut involves the use of "touch plates" which are printing plates that apply a small amount of one or more special color inks to manually selected areas of an image that has already been printed using four-color-process CMYK inks. Such touch plates are generally employed to enhance the appearance of important subjects or to create special color effects that cannot be achieved with CMYK inks alone, but their creation is costly, time consuming and requires great manual skill and experimentation. Prepress proofing for touch plates is generally restricted to the expensive process of "press-proofing" using actual trial plates and the selected color inks. The problem of screen angles mentioned before is also present with touch plates.

U.S. Pat. No. 5,184,214 (Tatsumi) discloses a system for processing an image input signal and producing an image output signal in order to record an image on an image recording medium. The image input signal is converted to a signal which matches the image output system and is also based on corrective parameters to achieve given color qualities. The image signal is also converted to a signal which matches the image recording medium.

U.S. Pat. No. 5,211,546 (Arazi et al.) discloses a method for adjusting color images in which a first image known to print in an acceptable fashion is displayed on a monitoring device, and a second image is displayed on a second device and modified to approximate the visual impression of the first image. In this method, whenever colors are called for that exceed the printing device's color printing range, the operator is alerted to make changes necessary to bring the image back into the available printing range.

U.S. Pat. No. 4,837,613 (Paxton et al.) discloses a method for selecting the intensity level of the primary colors used in displaying or printing a desired color composed of a specified percent of each of the primary colors. Each primary color is represented by two discrete intensity levels for that color. One intensity level is below or equal to the desired color intensity level, and the other is above or equal to the specified percentage.

U.S. Pat. No. 4,992,862 (Gabor) discloses an apparatus for video display that processes printing data in a two-step process. The first step relates the printing data to only one of a plurality of non-additive color components with a selected color reproduction function, and the second step relates the printing data to only two of the plurality of non-additive color components with a selected color reproduction function.

U.S. Pat. No. 5,077,604 (Kivolowitz et al.) describes a method and apparatus for receiving red, green and blue color separation signals from a color scanner and converting these signals into cyan, yellow, magenta and black signals having approximately the same color ratio as the red, green and blue signals. The cyan, yellow, magenta and black signals are subsequently used on a four-color printing device such that the printed image will have approximately the same color ratio as the original red, green and blue image.

U.S. Pat. No. 4,965,664 (Udagawa et al.) describes a color image signal processing apparatus for recording a color image from color image input signals. The apparatus includes a color correction unit for performing color correction based upon a luminance signal converted by a gradation converter, a hue signal and a chroma signal. The hue and chroma signals are based on spectrum tristimulus values which are obtained through conversion of the color image input signals.

In these conventional processes, special efforts are made to ensure that the color range of the image as displayed on the display device is restricted to those colors within the color printing range of the printing device, the printing device itself generally being used to print with four plates, one plate for each of the conventional four-color-process CMYK inks. It is also generally the case that the additive RGB color system employed on the display device is capable of displaying a greater color range than can be printed with conventional four-color-process printing. If it were possible to increase the color printing range of the printing device, it would be possible to increase the corresponding color range of the display device. This would be particularly important when electronic color editing of an image is done to achieve special aesthetic or artistic effects, and also when attempting to match a particular original image. Accordingly, it is believed to be advantageous to provide a method for extending the color printing density range of a printing device without introducing special or non-process printing inks or unconventional pre-press proofing systems, and without introducing additional moiré problems or requiring exotic screening methods, while at the same time increasing the printing density range in a manner that is flexible in the number of extra plates that can be used.

SUMMARY OF THE INVENTION

The present invention comprises a process for reproducing an original color image on a printing device wherein each pixel of the original image is separated into a plurality of color components to obtain an image density value for each color component at each pixel, thereby obtaining a data file of the image density values for each color component. The image density values for each color component are compressed to fit within a range of printing density values having a maximum value achievable on the printing device using printing elements corresponding to the color components. Using the present process, a number of printing elements are selected for each color component, the number of printing elements being more than one for at least one of the color components. The printing density values for each color component having more than one printing element are separated into at least two pixel groups, the first pixel group containing printing density values less than or equal to an assigned maximum printing density value achievable with a single printing element for that color component, and the second pixel group containing printing density values greater than said assigned maximum printing density value for that color component. Printing elements are prepared for each color component having more than one printing element wherein a first printing element produces printing density values equal to the printing density values for each pixel in the first group and also produces printing density values equal to said assigned maximum printing density value for each pixel in the second pixel group, and a second printing element produces printing density values obtained by subtracting said assigned maximum printing density value from the printing density value for each pixel in the second pixel group.

DETAILED DESCRIPTION OF THE PREFERRED EMBODIMENTS

Figure 1:
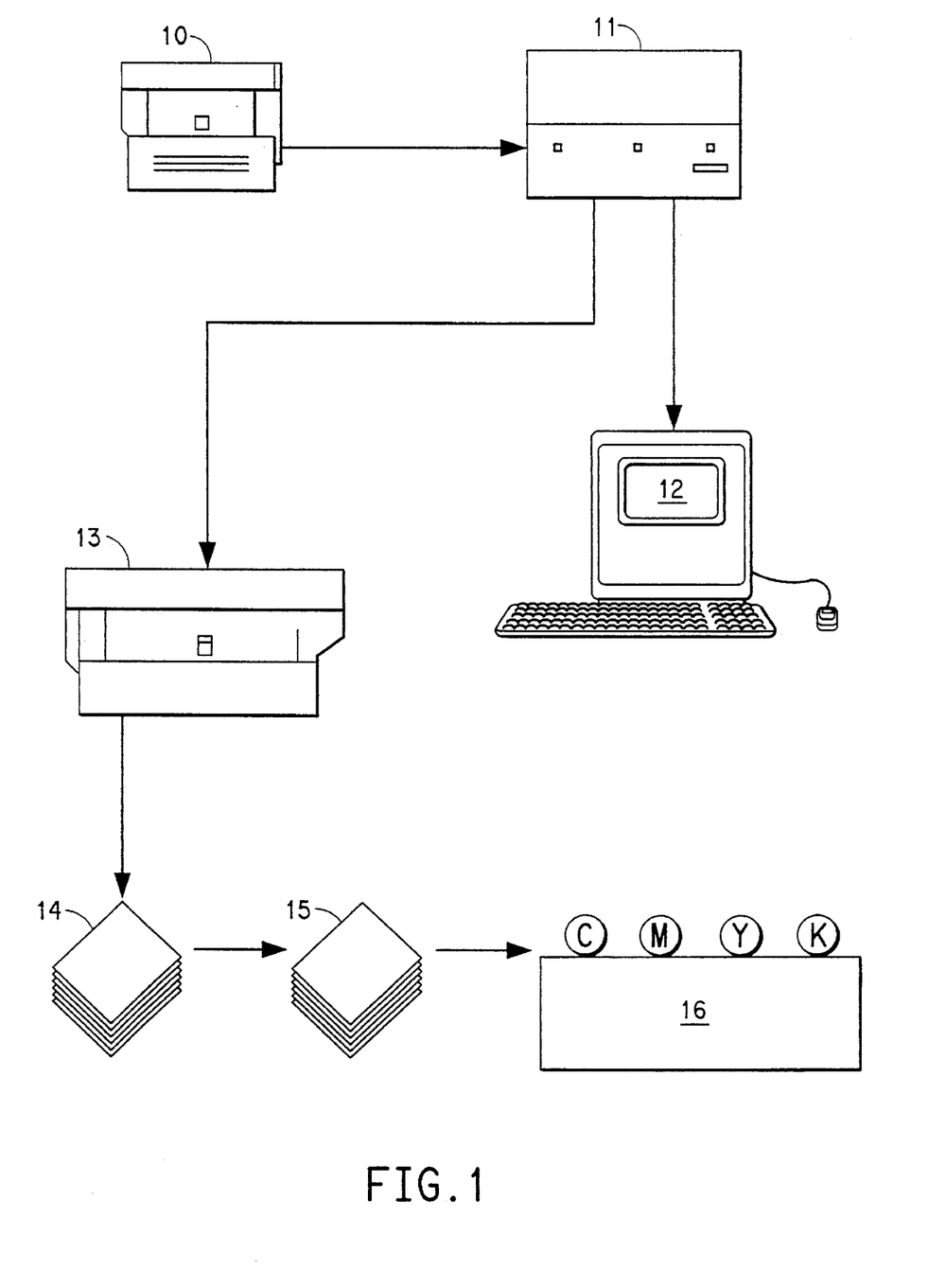
FIG. 1 is a diagrammatic illustration of the major elements used in reproducing a printed color image, the image initially being recorded in photographic film or artificially produced on a color monitor.

FIG. 1 shows the major elements in conventional reproduction of a printed color image, the image initially being prerecorded in photographic film or artificially produced on a color monitor. A color scanner 10 separates an original color image into color-separated density data files that are processed by a central processing unit (CPU) 11 prior to being supplied to a color monitor 12 for viewing by an operator. During set-up, standard test targets having known color density values are color separated on the scanner 10, and the subsequent image data files are analyzed to determine the relationships between the scanner's color image data and their corresponding original density values. The resulting translation files, one for each of CMY, contain binary density values which are retained in memory as three Look-Up-Tables (LUTs) and are subsequently applied to all image data files produced by the scanner 10. This is well known as an "input calibration" process. A similar "output calibration" process is performed in which a standard image having known dot percentage values is converted by an exposure device, for example a laser plotter 13, into color separated films 14, each film containing the dot percentage data of a single color. These films 14 are used to produce color printing plates 15 for use on a color printing press 16, or to produce a pre-press proof which closely simulates the performance of the press 16. The printed sheet or proof is then analyzed by densitometry or colorimetry to determine the resulting color density values. During the remainder of this disclosure, it is assumed that appropriate input and output color calibrations are accomplished using such conventional methods. In addition, specific calibration methods integral to this invention are described where appropriate.

Figure 2:
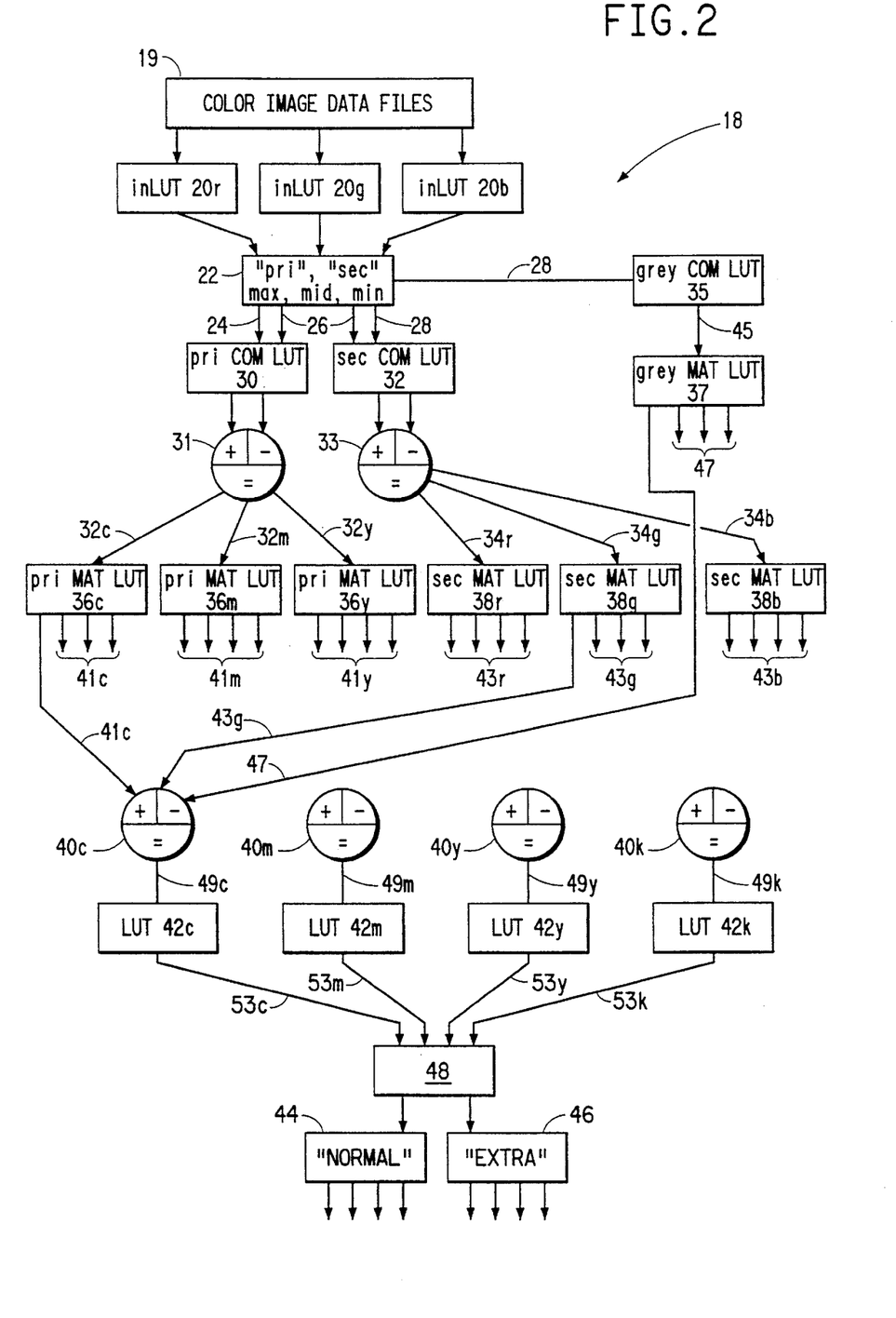
FIG. 2 is a schematic block diagram showing a process for producing multiple color separation printing files in accordance with the present invention.

FIG. 2 shows a process 18 for producing multiple color separation printing files 44 and 46 for a color image in accordance with the present invention after input color analysis has been made of an original color image using well-known color scanning techniques. Conventionally, three color image data files 19, usually expressed as red(R), green(G) and blue(B), are provided in a nonuniform color space from the color scanner 10. It is also possible that similar color image data files 19 can be electronically produced by means of popular desk-top publishing computer-assisted programs that generate color images on the color monitor 12. Such files normally contain color image data recorded as RGB luminance values corresponding to RGB phosphors employed in the color monitor 12. Since the more common use of color image data files follows from conventional color separation processes, the present invention will be described for the case where image data files 19 are derived from a color separation scanning process. This invention can also be practiced using color image data expressed in terms other than RGB, such as CMYK, XYZ or L*a*b*, but will be described in terms of RGB for convenience.

The color image data within each file 19 are converted by means of three inLUTs 20r, 20g and 20b into image density values corresponding to the CMY color density values of the original image, using the formula:

density value=$\log_{10}$ (1/luminance value)

The range of the original image density values is then compressed using a conventional technique. Within each inLUT 20, allowance is made for control settings that enable an operator to specify a desired minimum density value of the original color image, and a desired maximum density value of the original color image, both of which are adjusted by a conventional compression technique to equal predetermined density values, typically 0.2 and 3.2, that represent convenient minimum and maximum density values for the process 18. Image density values that are above or below these limits may be preserved for subsequent image processing so that even after specifying the desired minimum and maximum density values of an image, an operator may later modify those selections to restore image density values outside the originally selected range. Within each inLUT 20, the color image data may optionally be converted to a standard color space so as to make this process device independent. This is accomplished by converting the RGB luminance values to expressions meaningful in a uniform color space such as XYZ or L* a* b*, but where these expressions are preserved in density-like units so as to remain compatible with the density calculations embodied in the invention. Further within each inLUT 20, various input calibration effects, such as film exposure and film type, can be incorporated for convenience. Additional corrections may be made to compensate for errors in creation of the original image, or to introduce deliberate appearance changes if desired.

The compressed image density values are then analyzed pixel-by-pixel in an arithmetic comparator 22 to determine two "coloredness" components, hereinafter referred to as a primary component representing the primary C, M or Y "coloredness" value of each pixel, and a corresponding secondary component representing the secondary R, G or B "coloredness" value of each pixel. Within the arithmetic comparator 22, the C, M and Y image density values of each pixel are sorted by magnitude and assigned accordingly as maximum 24, middle 26 and minimum 28 image density values. The primary component is identified by the name of the maximum value 24 of the pixel's C, M and Y density values. The secondary component is identified by the name of the R, G or B color that results from combining the middle 26 and maximum 24 C, M and Y density values.

Figure 4:
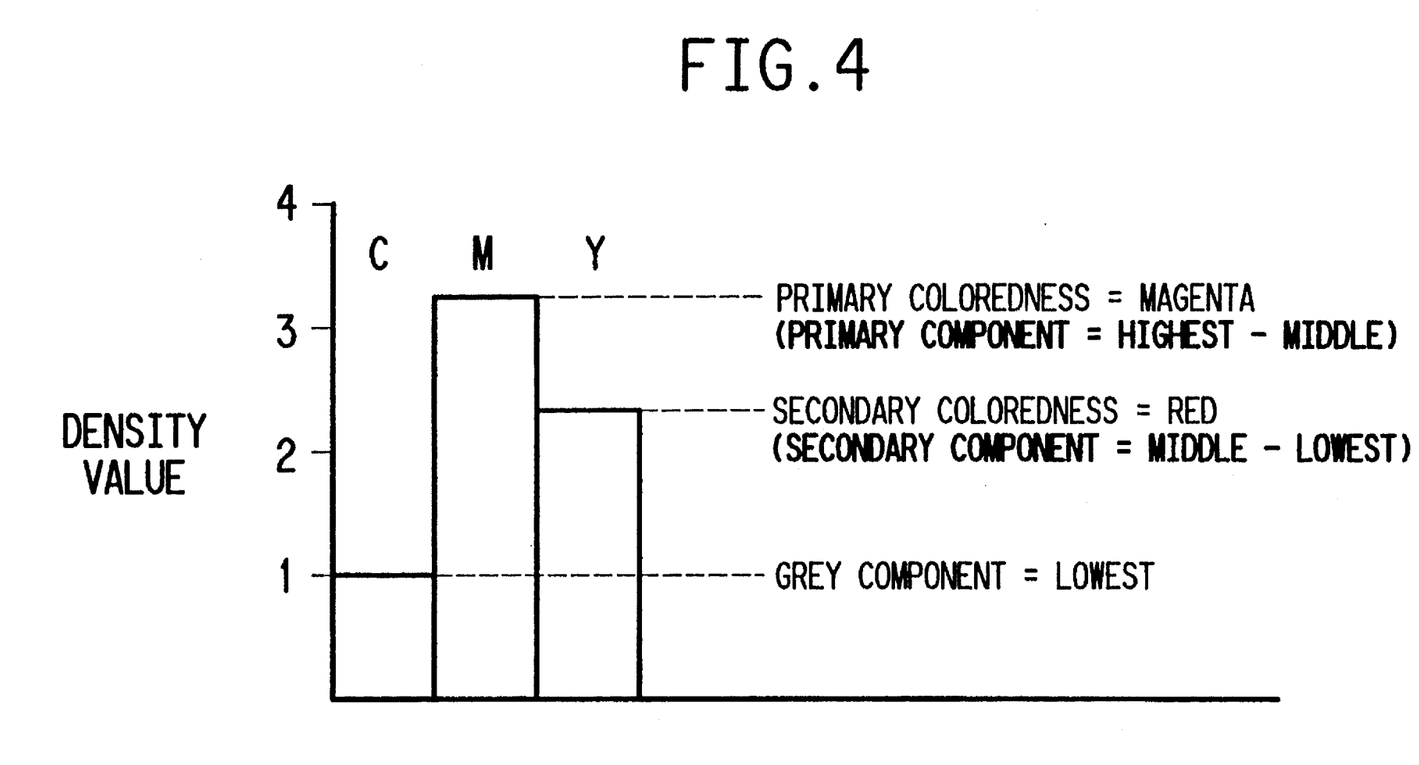
FIG. 4 is a bar graph illustrating an assignment of "coloredness" to a pixel in accordance with the present invention.

FIG. 4 illustrates an example wherein the maximum 24 and middle 26 CMY density values of a selected pixel are the pair M and Y, respectively. The primary component is identified as magenta, and red is assigned as the secondary component. In other instances, not illustrated, if the maximum 24 and middle 26 density values are the pair C and Y, respectively, the primary component is identified as cyan, and green is assigned as the secondary component. If two CMY density values are equal, either one can take the disputed position without affecting the result of the process. If all three CMY density values are equal, any density value can take the disputed position.

A key feature of the present invention enables an operator to specify that an "extra" C, M, Y or K printing plate or, more preferably, any combination of "extra" C, M, Y and K plates be used to increase the maximum printable density values achievable on a printing device. This feature enables an operator to more accurately reproduce an original scanned image or an electronically generated image. The advantage of using these "extra" plates is the ability to reproduce a more accurate color match to the original image, in particular in highest density areas, than is possible using the conventional procedure which employs only one printing plate for each of the CMYK printing ink colors. Use of these "extra" printing plates results in the maximum printable density values for each of the standard process printing ink colors (CMY) being higher than for conventional printing processes. Use of these "extra" plates also results in variable maximum density values for the tertiary colors R, G and B which arise from two-color overprints of the CMY inks, depending on what combinations of "extra" plates are selected. It should be noted that if, for example, only C and Y are selected as extra printing plates, the maximum printable C, M, Y, R, G and B density values are different than is the case if, for example, only C and M are selected as extra printing plates.

As a consequence of this feature, maximum printable C, M, Y, R, G and B density values may vary widely depending on the extra printing plates selected. This is in contrast to the conventional practice wherein approximately similar maximum printable C, M, Y, R, G and B density values are obtained because only single C, M, Y and K printing plates are employed. Within the scope of this invention is the independent "compression" of image density values associated with each pixel's primary and secondary components according to the maximum printable density values achievable with different combinations of the "extra" C, M, Y and K printing plates, resulting from the operator's choice of the particular "extra" plates to be employed.

Each pixel's maximum image density value 24 and middle image density value 26 are both passed through one of three primary compression LUTs 30 corresponding to C, M or Y as defined by the name of the primary component (C, M or Y) for that pixel. For clarity of illustration, only one of the three possible primary compression LUTs 30 is shown. Similarly, the pixel's middle image density value 26 and minimum image density value 28 are both passed through one of three secondary compression LUTs 32 corresponding to R, G or B as defined by the name of the secondary component (R, G or B) for that pixel. For clarity of illustration, only one of the three possible secondary compression LUTs 32 is shown. In both instances, the smaller image density values, now compressed, are subtracted from the larger image density values, also now compressed, by arithmetic adder units 31 and 33, respectively, to yield compressed primary and secondary component image density values 32 and 34, which are within the printable range of density values for each color. The compressed primary image density value 32 obtained from the subtraction occurring at arithmetic adder unit 31 is a compressed C or M or Y image density value, and the compressed secondary image density value 34 obtained from the arithmetic adder unit 33 is a compressed R or G or B image density value. The compression of the maximum, middle and minimum image density values 24, 26 and 28 in the above described manner through six (6) separate LUTs (three primary LUTs and three secondary LUTs 32) corresponding to C, M, Y, R, G and B, prior to determining their difference, enables density compression to be optimized so as to best utilize the various maximum printing density values made available by any combination of "normal" and "extra" printing plates as provided by this invention.

Another key feature of the present invention is the independent compression of the six coloredness values which ensures that a pixel is compressed proportionally to its colored components, so that the hue of the printed pixel more closely matches the hue of the original pixel than if the individual maximum, middle and minimum image density values had been independently compressed. The buildup of the LUTs 30 and 32 is described hereafter. In addition to consideration of the combination of selected printing plates, the compression process also adjusts to the actual maximum density values of each of the six coloredness components in each individual image, as determined, for example, by histogram analysis of the image data files 19. This further feature of the invention optimizes image appearance by ensuring that low-saturation images receive less color compression than heavily saturated images. For example, an image containing no heavily saturated reds may have a maximum original red coloredness density value lower than the maximum printable redness density value available on the output printing device, in which case the redness compression LUT will have no need to compress the incoming redness density values, even though the maximum magenta coloredness value in the original image may dictate a significant compression factor for magenta density values. Meanwhile, if in another image the maximum original redness density value is larger than the maximum printable redness density value, significant compression will be applied to bring the highest original redness density values into a printable range. In this latter case, it will also be necessary to compress some of those original red density values that lie within the printable range, so as to preserve a realistic visual relationship between those and any more highly saturated (and thus more vigorously compressed) red density values.

The compressed primary image density values 32c, 32m and 32y are next processed through three corresponding primary color matching LUTs 36c, 36m and 36y which have been previously assimilated so as to provide, respectively, three primary sets 41c, 41m and 41y of C, M, Y, and K SID (Single Ink Density) printing values which, when printed together in register on the ultimate printing device, will produce printed colors having a close match to the colors of the primary image density values 32c, 32m and 32y. Using the same procedure, the compressed secondary image density values 34r, 34g and 34b are processed through three corresponding secondary color matching LUTs 38r, 38g and 38b which have been similarly previously assimilated so as to provide, respectively, three secondary sets 43r, 43g and 43b of C, M, Y and K SID printing values which, when printed on the ultimate printing device, will produce printed colors having a close color match to the colors of the secondary image density values 34r, 34g and 34b.

Figure 3A:
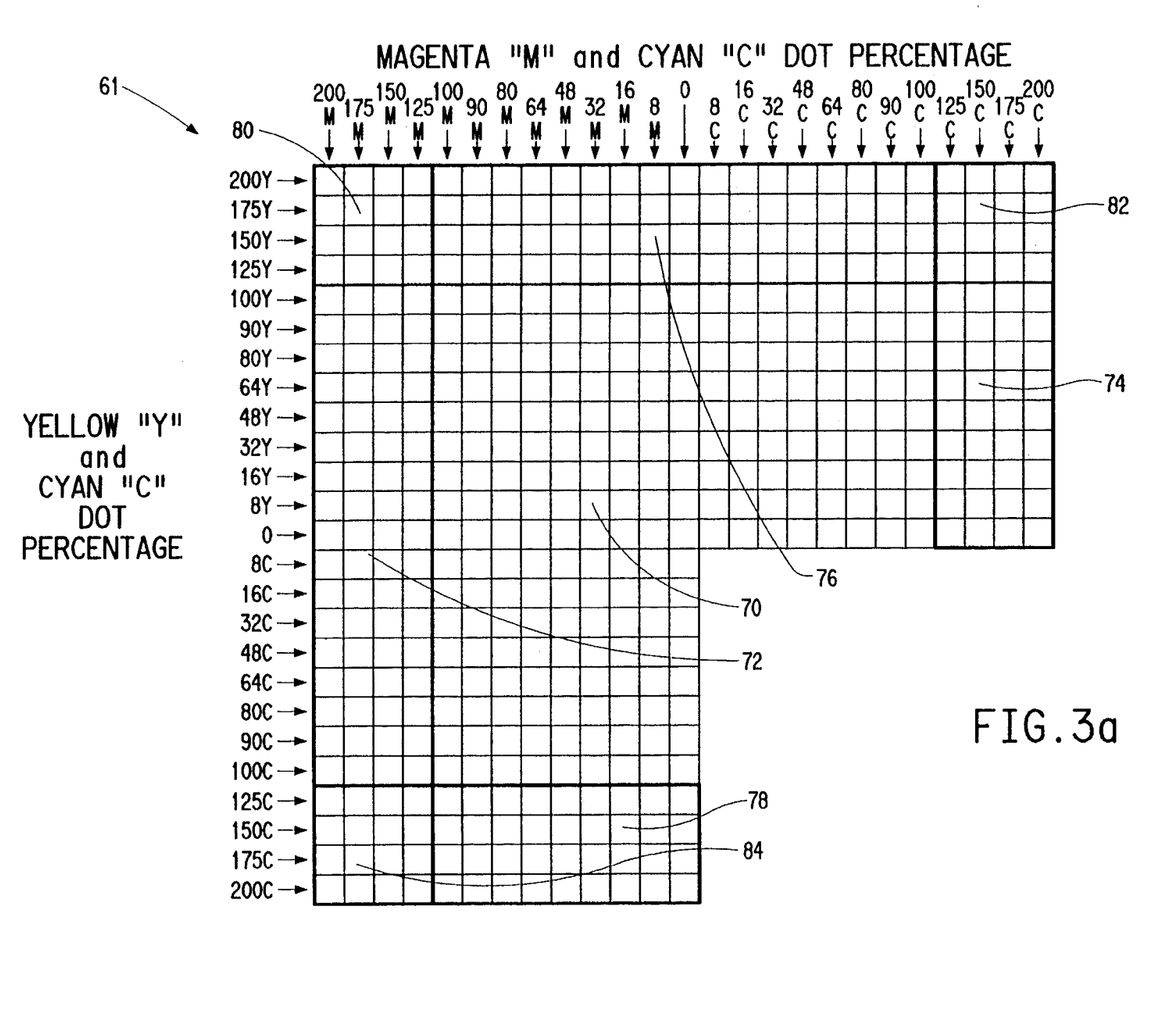
FIGS. 3a and 3b are graphs illustrating calibration targets that are useful in determining maximum output printing density values in accordance with the present invention.

FIG. 3a shows a calibration target 61 useful in an output calibration process wherein the CMYK SID printing values provided by the LUTs 36c, 36m, 36k and LUTs 38r, 38g, 38b are derived using the device being calibrated. The LUTs 36c, 36m, 36k 38r, 38g and 38b are created by analyzing the colorimetric characteristics of the printed calibration target and correlating these to the C, M, Y and K dot percentage values of the printing films used to produce the target. This target 61 is also used to determine the maximum C, M, Y, R, G, and B printing densities when "extra" C, M, Y and K printing plates are used on the printing device.

A grey image density value for each pixel is obtained from the minimum image density value 28 and processed through a grey compression LUT 35 to produce a compressed grey image density value 45 which is within the printable range of the device using the compression method described later for building the LUTs 30 and 32. The compressed grey image density value 45 is then passed through a grey matching LUT 37 which has been previously assimilated so as to provide a grey set 47 of CMYK SID printing values which, when printed together on the ultimate printing device, will produce a printed grey having a close match to the compressed grey image density value 45. These SID printing values for the grey set 47 are called corrected grey image density values, and are generated in accordance with the requirements of operator controls governing grey balance, Grey Component Replacement (GCR), Under Color Removal (UCR) and Under Color Addition (UCA), using techniques that are well known within the industry.

Figure 3B:
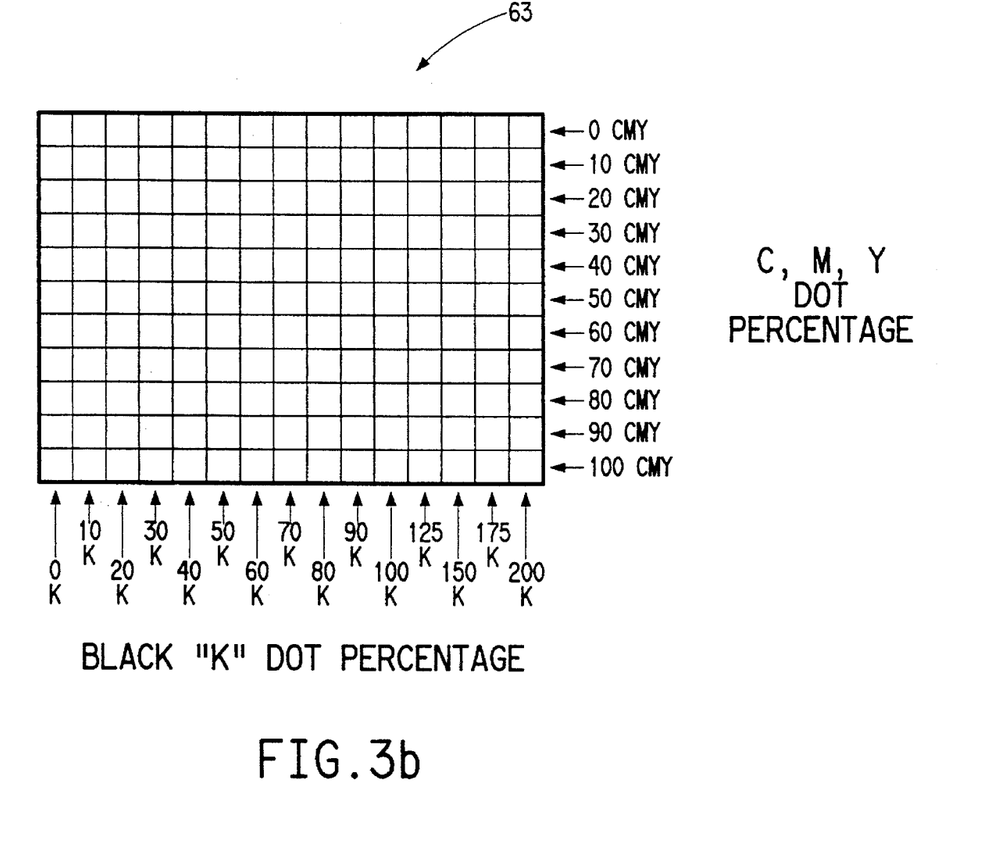

FIG. 3b shows a 2-dimensional calibration target 63 useful in assimilating the grey matching LUT 37 by analyzing the result of printed dot percentage values in increments of C, M and Y over increments of K.

Four arithmetic adders 40c, 40m, 40y and 40k combine, respectively, the C, M, Y and K SID printing values from the primary set 41 with the C, M, Y and K SID printing values from the corresponding secondary set 43 and the C, M, Y and K SID printing values from the grey set 47 to obtain summed SID printing values 49c, 49m, 49y and 49k for each of the pixels within the original image. The summed SID printing values 49c, 49m, 49y and 49k are processed, respectively, through LUTs 42c, 42m, 42y and 42k which have been previously assimilated, using test targets similar to those illustrated in FIGS. 3a and 3b, to provide corresponding output dot percentage values 53c, 53m, 53y and 53k ranging from 0–200% for, respectively, the C, M, Y and K colors to be printed at each pixel.

The output dot percentage values 53c, 53m, 53y and 53k ranging from 0–200%, are now separated by an arithmetic comparator 48 into a "normal" imagewise array 44 of output dot percentage values and an "extra" imagewise array 46 of output dot percentage values. The "normal" imagewise array 44 is comprised of those output dot percentage values in the range 0–100%. The "extra" imagewise array 46 is comprised of output dot percentage values obtained by subtracting 100% from each of the output dot percentage values in the range 100–200%. Every output dot percentage value greater than 100% is assigned 100% in the "normal" imagewise array. Although the assigned maximum printing density is 100% in the foregoing preferred embodiment, a percentage somewhat less than 100%, for example, 95%, may be assigned as the maximum printing density for the "normal" array or printing plate in the present invention.

Four "normal" printing plates are prepared for the C, M, Y and K printing inks using the output dot percentage values from the "normal" imagewise array. One or more "extra" printing plates, previously selected by the operator, are prepared using the "extra" imagewise array values 46 for C, M, Y and K. The normal and extra plates are then printed in register on the output device using conventional inks and conventional printing density values. Alternately, non-conventional inks or density values may be used in order to intensify or otherwise alter the final range of printable colors or density values, or to achieve other printing benefits. In such instance, the output calibration targets 61 and 63 must also be printed with these modified conditions, and the data from the modified targets 61 and 63 must be assimilated into the matching LUTs and other related calibration files used by the process.

The printed calibration targets 61 and 63 are useful in deriving the matching LUTs 36 and 38 for each of the six colors C, M, Y, R, G and B, and the maximum printable coloredness density values produced by different combinations of the "extra" C, M, Y and K printing plates. The calibration target 61 is constructed as follows. A central portion 70 contains dot percentage values from 0–100% of C, M and Y and their two-color overprints, as shown by the row values of FIG. 3a. Portions 72, 74, 76 and 78 contain dot percentage values from 0–100% of a first color overprinted by 100–200% of a second color. Portions 80, 82 and 84 contain dot percentage values from 100–200% of two different colors. In FIG. 3b, the calibration target 63 contains dot percentage values from 0–200% of K overprinted with dot percentage values from 0–100% of C and the equivalent grey-balanced amounts of M and Y. The calibration targets 61 and 63 are initially produced on the printing device using eight plates and the same CMYK inks that will be used in subsequent practice, for example, the Toyo™ inks sold by E. I. du Pont de Nemours and Company. The printed calibration targets 61 and 63 are measured by a color analysis device such as a densitometer, colorimeter or spectrophotometer, and the resulting colorimetric values are tabulated alongside the dot percentages used to print each target patch and stored for repeated reference.

The three primary compression LUTs 30 and the three secondary compression LUTs 32 are constructed according to the maximum image density values for C, M, Y, R, G and B in the color image data files 19 and the maximum density values achievable with each ink. A maximum image density value for each of C, M, Y, R, G and B within the original color image data files 16 is determined first, for instance, by histogram analysis of the original image. These maximum image density values are then compressed independently to fit the maximum printable density values for each of C, M, Y, R, G and B, achievable when the normal and extra plates selected by an operator are printed in register on the printing device using conventional inks and conventional printing density values as determined using printed targets, like the ones illustrated in FIGS. 3a and 3b (described hereafter), created during the output calibration cycle. The maximum printable density values for C, M, and Y are determined by searching the target data file for the maximum coloredness density recorded for the maximum allowed dot percentage of 100% or 200% for C, M or Y, respectively, as determined by the user's plate selection. Similarly, the maximum printable density values for R, G and B are determined by searching the target data file for the maximum coloredness density value recorded for the maximum allowed dot percentage for whichever of the two contributing inks in each of R, G or B has the lowest maximum allowed percentage (100% or 200%) as determined by the user's plate selection.

Similarly, the maximum printable density values for grey are determined by searching the calibration target 63 of FIG. 3b for the maximum neutral density comprising a combination of some or all of the colorants as determined by the user's plate selection and other controls governing requirements such as grey balance. The grey compression LUT 35 is constructed according to the maximum neutral black image density value and the maximum density value achievable on the printing device as determined using a printed target, like the target 63 illustrated in FIG. 3b, created during the output calibration cycle.

The technique used to compress the maximum C, M, Y, R, G, B and grey image density values in the original image to the maximum printable C, M, Y, R, G, B and grey density values builds seven density-to-density compression curves that are unique for each color, including grey, and for each image. All possible original coloredness or grey density values up to the maximum determined to be present in each original image are converted to their equivalent luminance values, the luminance values are compressed linearly to fit the available range of luminance values defined by the available range of output density values, and the compressed luminance values are then re-converted back to their equivalent density values. The compression tables are assembled in such a way as to assign a compressed density value for each possible uncompressed original density value, including grey.

Figure 5:
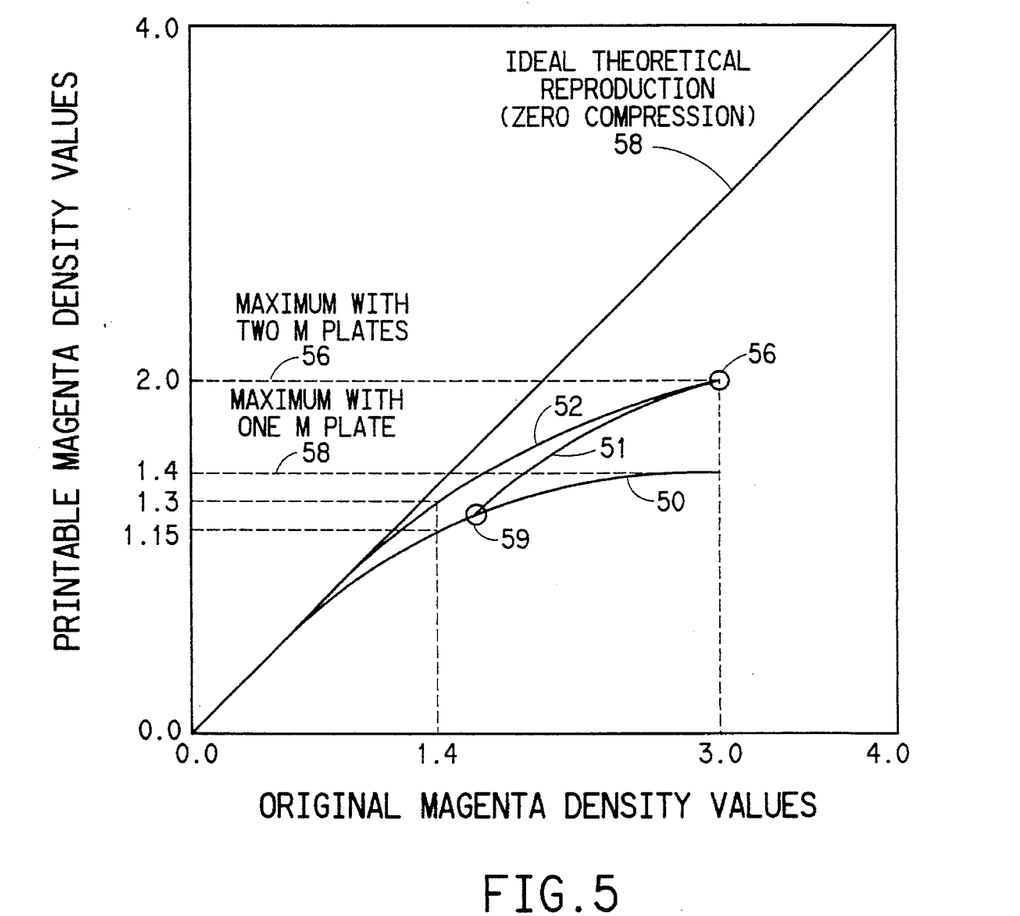
FIG. 5 is a graph illustrating compression of the original magenta density values of a pixel in accordance with the present invention.

FIG. 5 illustrates the effect of the primary compression LUT 30 that might be used for magenta M for a first case in which a single magenta printing plate is used, indicated by line 50, or for a second case in which an "extra" magenta printing plate is used, indicated by line 52. In the first case, an original image containing, for instance, a first pixel having a primary coloredness identified as magenta, with a density value of 3.0, would be compressed to have a maximum magenta density value of about 1.4, while a second pixel having an original density value of 1.4 would be compressed to have a magenta density value of about 1.15. In the second case, the first pixel having an original magenta density value of 3.0 would be compressed to have a maximum magenta density value of about 2.0, while the second pixel, having an original magenta density value of 1.4, would be compressed to have a magenta density value of about 1.3. The advantage of compressing by the lesser amount shown by line 52, when printing with an extra magenta plate, is that the resulting magenta density values, although still not as high as in the original image, more closely approximate the original image density values shown as line 58.

FIG. 5 further illustrates that this process is not just a simple addition of "extra" CMYK plates to obtain output printed density values higher than otherwise obtainable with conventionally produced "normal" CMYK plates. Line 50 represents the compression curve for a magenta plate from a normal CMYK separation, and line 51 represents the density addition achieved by over-printing this conventional CMYK separation with an "extra" magenta plate. The addition of the "extra" plates clearly improves the maximum density achievable, as defined by point 56, but a pixel having an original magenta density value of 1.4 will still be compressed to have a density value of about 1.15, not the improved value of 1.3 obtainable if the "normal" plates were produced by this invention. The abrupt change in slope of the overall compression curve at point 59 will be seen in the final printed sheet as an unnatural increase in contrast. As provided by the present invention, the output dot percent values obtained with the first printing plate of each color are increased in anticipation of the higher maximum output printing densities obtained with the "extra" printing plate of that same color in such a way that the final density reproduction curve increases smoothly with no visible step change. Furthermore, those parts of a conventional magenta plate corresponding to original density values higher than that represented by point 59 will contain dot percentage values less than 100%, thus causing the potential for moiré interference between the dot pattern of the conventional magenta plate and that of the "extra" plate. Yet another difference between the "normal" separations made by this invention and conventional CMYK separations of the same original is that the selection of an "extra" magenta plate can also affect the dot percentage values of the C, Y and K "normal" plates in areas printed with both magenta plates.

The same inter-plate effects are produced by the selection of two cyan, yellow or black plates, and result from calibrating the matching LUTs 36 and 38 so as to provide a wider range of compressed image density values than are normally possible with conventional CMYK separations. Such inter-plate effects cannot be replicated in conventional CMYK separations unless an approach similar to that embodied in this invention is employed.

What is claimed is:

1. In a process for reproducing an original color image on a printing device wherein each pixel of said original image is separated into a plurality of color components to obtain an image density value for each color component at each pixel, thereby obtaining a data file of said image density values for each color component, and wherein said image density values for each color component are compressed to fit within a range of printing density values having a maximum value achievable on said printing device using printing elements corresponding to said color components, the improvement in said process comprising:

selecting a number of printing elements for each color component, said number of printing elements being more than one for at least one of said color components;

separating the printing density values for each color component having more than one printing element into at least two pixel groups, said first pixel group containing printing density values less than or equal to an assigned maximum printing density value achievable with a single printing element for that color component, and said second pixel group containing printing density values greater than said assigned maximum printing density value for that color component; and preparing printing elements for each color component having more than one printing element wherein a first printing element produces printing density values equal to the printing density values for each pixel in said first group and also produces printing density values equal to said assigned maximum printing density value for each pixel in said second pixel group, and a second printing element produces printing density values obtained by subtracting said assigned maximum printing density value from the printing density value for each pixel in said second pixel group.

2. A process according to claim 1 wherein said compressing step is performed by determining a first set of image density values that reflect a primary coloredness value for each pixel of said original image, determining a second set of image density values that reflect a secondary coloredness value for each pixel of said original image, and independently compressing both said first and said second sets of image density values through primary and secondary compression means, respectively, to obtain compressed primary and secondary image density values fitting within the range of printing density values for said primary and said secondary coloredness values, respectively, achievable on said printing device using the selected number of printing elements for each color component.

3. A process according to claim 2 wherein each pixel is separated into C (cyan), M (magenta) and Y (yellow) image density values, wherein said first set of image density values for each pixel comprises the maximum and middle image density values with the primary coloredness value for each pixel being identified by the maximum image density value, and wherein said second set of image density values for each pixel comprises the middle and minimum image density values with the secondary coloredness value for each pixel being identified by the color resulting from an overprint of the color components having the maximum and middle image density values.

4. A process according to claim 3 wherein the compressed primary image density value is obtained by first compressing the maximum and middle image density values through the primary compression means and then substracting the compressed middle image density value from the compressed maximum image density value, and wherein the compressed secondary image density value is obtained by first compressing the middle and minimum image density values through the secondary compression means and then subtracting the compressed minimum image density value from the compressed middle image density value.

5. A process according to claim 4 wherein said primary compression means comprise three (3) LUTs (Look-up-Tables), and wherein said secondary compression means comprise three (3) LUTs.

6. A process according to claim 4 wherein the compression is varied according to the maximum primary and secondary coloredness values in said original image as determined by a prior analysis of all said first and said second sets of image density values.

7. A process according to claim 3 wherein said compressing step further comprises the step of compressing said minimum image density value for each pixel to obtain a compressed grey image density value, and wherein said compressed grey image density value is further processed through a grey matching means for selecting grey printing density values for each color component that provides a close match to the compressed grey image density value.

8. A process according to claim 2 wherein the compressed primary and secondary image density values are further processed through primary and secondary color matching means, respectively, for selecting printing density values for each color component that provide colors having a close match to the compressed primary and secondary image density values, and wherein the corresponding primary and secondary printing density values for each color are combined with the grey printing density values, respectively, into a single printing density value for each color component of each pixel.

9. A process according to claim 1 wherein said image density values for each color component are measured in a nonuniform color space.

10. A process according to claim 1 wherein said image density values for each color component are measured in a uniform color space.

* * * * *